May 1, 1962
H. C. PFAFF, JR
3,032,648
LIGHTING FIXTURE
Filed Jan. 8, 1959
3 Sheets-Sheet 1
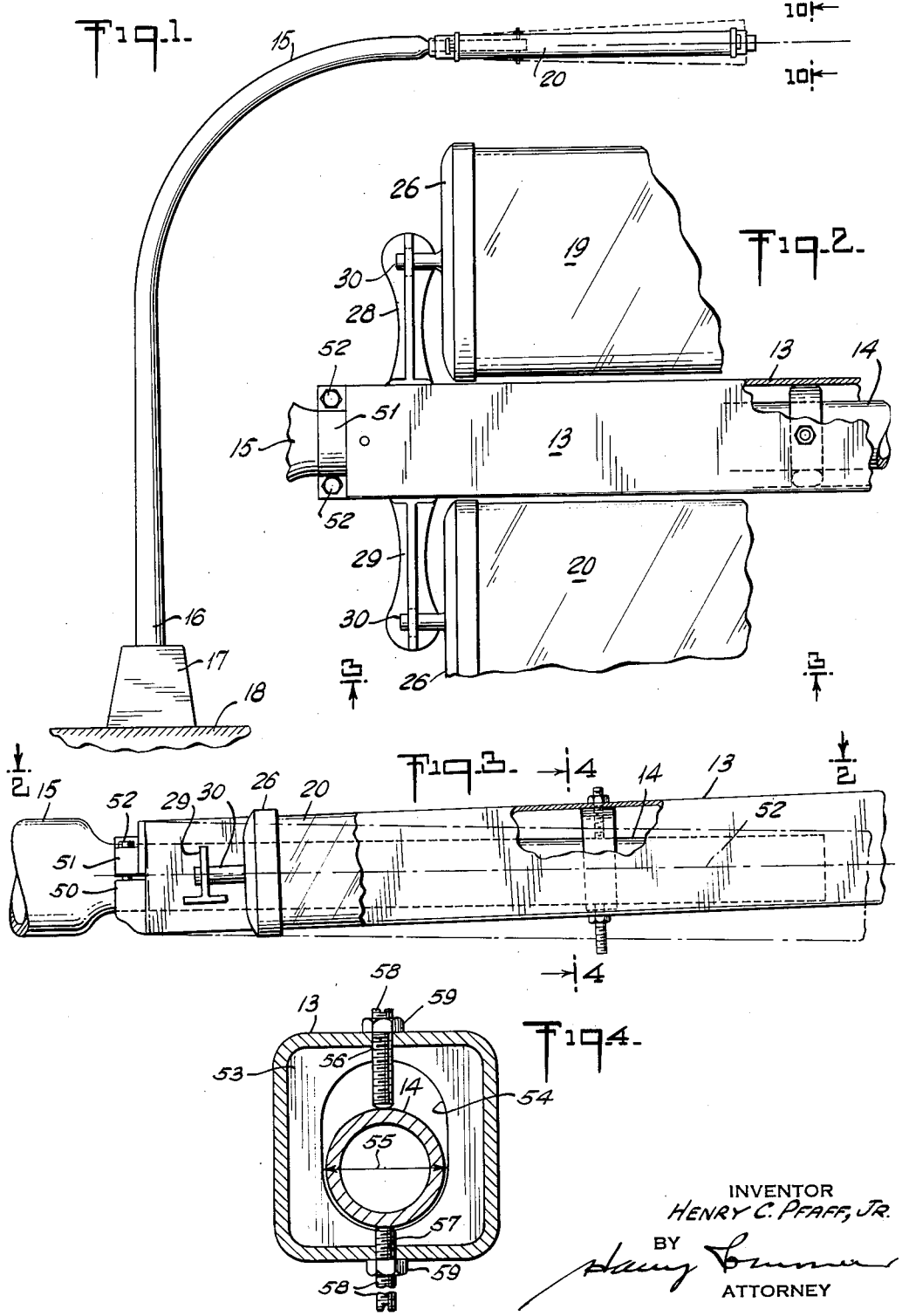
INVENTOR
HENRY C. PFAFF, JR.
BY
ATTORNEY May 1, 1962 H. C. PFAFF, JR 3,032,648
LIGHTING FIXTURE
Filed Jan. 8, 1959 3 Sheets-Sheet 2
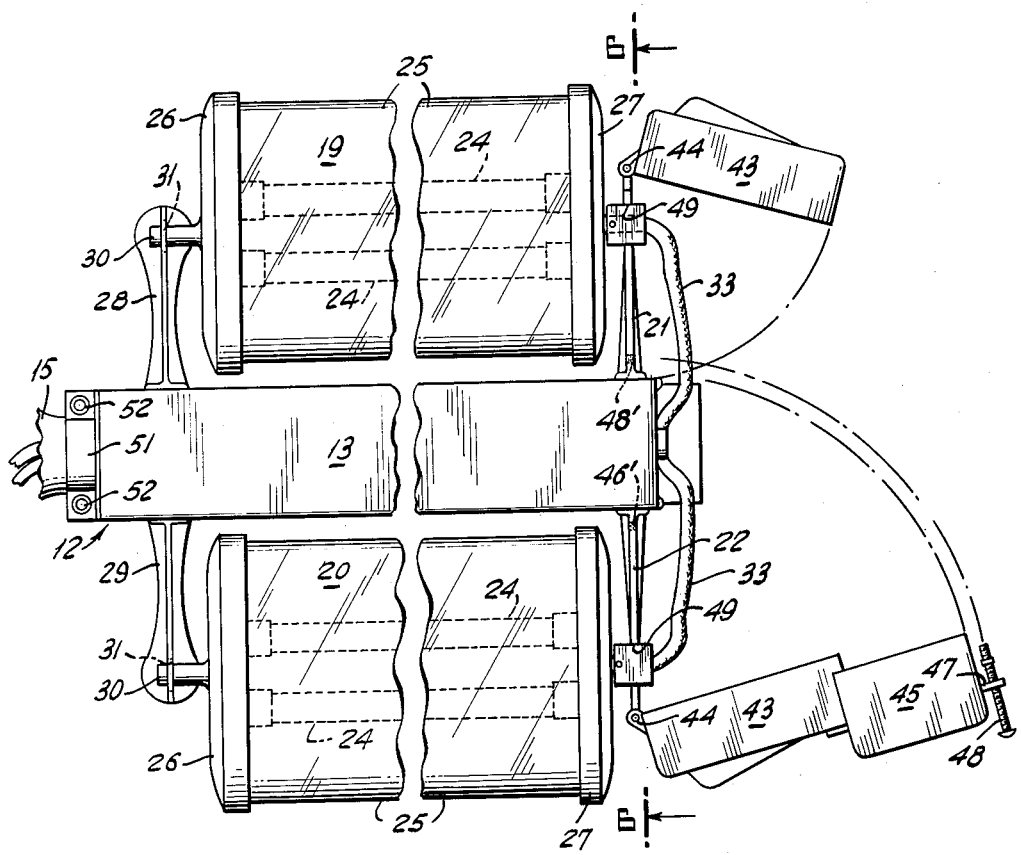
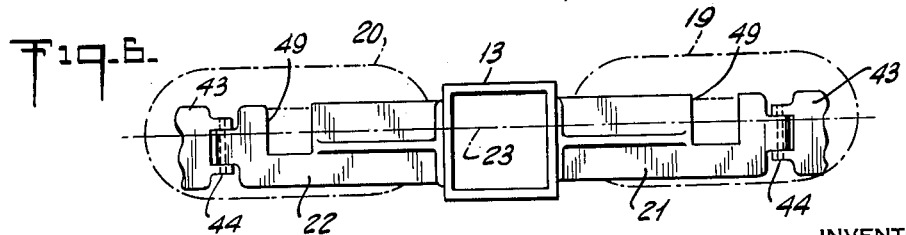
INVENTOR
HENRY C. PFAFF, JR.
BY
ATTORNEY May 1, 1962 H. C. PFAFF, JR 3,032,648
LIGHTING FIXTURE
Filed Jan. 8, 1959 3 Sheets-Sheet 3
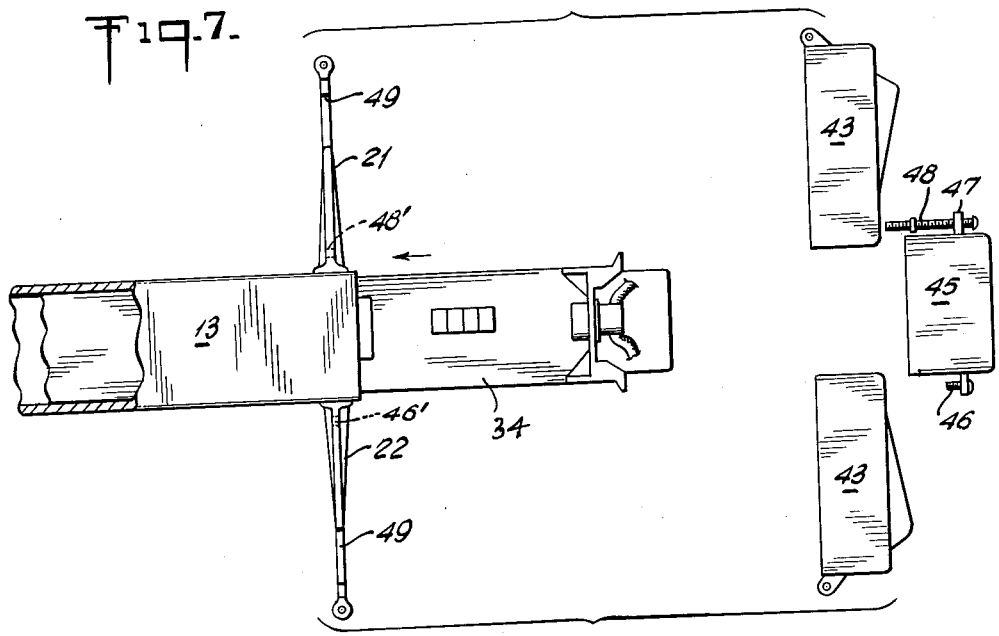
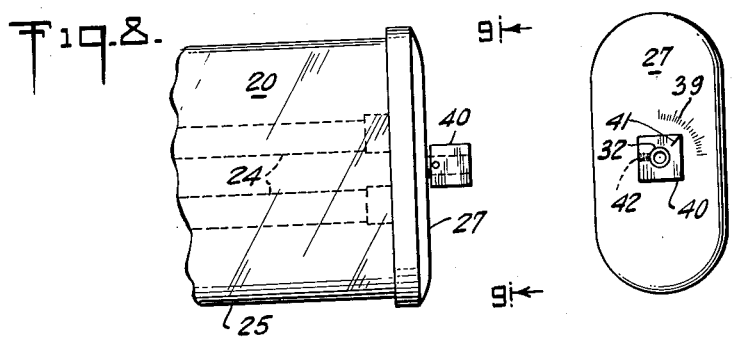
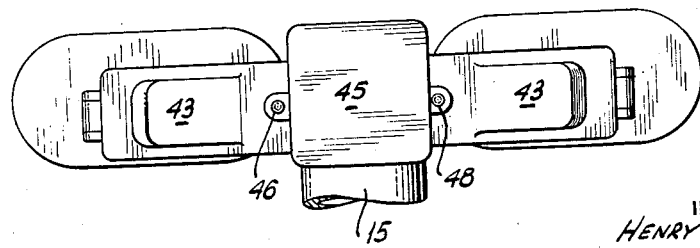
INVENTOR
HENRY C. PFAFF, JR.
BY
ATTORNEY United States Patent Office 3,032,648
Patented May 1, 1962

3,032,648
LIGHTING FIXTURE
Henry C. Pfaff, Jr., Summit, N.J., assignor to Pfaff and Kendall, Newark, N.J., a corporation of New Jersey
Filed Jan. 8, 1959, Ser. No. 785,641
13 Claims. (Cl. 240—25)

This invention relates to a lighting fixture of novel structural features enabling it to be pendantly secured to the free end of a shaft which is positioned along a roadway or other area to be lighted. The shaft may be (FIG. 1) in the form of a davit to which the lighting device of this invention is secured for horizontal disposition over the area to be illuminated, or the shaft 15 may be secured to the side of a building or other structure.

Pursuant to the invention, novel means are provided for securing said lighting device to supporting structures, including means for rotating the casings of the lighting device on their longitudinal axes, and for securing them in the desired angular position, to thereby predetermine the path of light rays emanating therefrom.

The above and other novel features of the invention will become apparent from the description below and the accompanying drawings, examplary of devices embodying the invention as defined in the appended claims.

In said drawings:

FIG. 1 is a side elevational view of a lighting fixture embodying the invention, shown secured to the free end of a support structure, FIG. 2 is an enlarged, fragmentary, partly sectional top plan view thereof, taken at line 2—2 of FIG. 3, FIG. 3 is a fragmentary, side elevational view thereof, taken at line 3—3 of FIG. 2, FIG. 4 is an enlarged transverse, sectional view thereof taken at line 4—4 of FIG. 3, FIG. 5 is a partly fragmentary, plan view of said lighting fixture, shown secured to the free end of a support structure, FIG. 6 is an end elevational view thereof taken at line 6—6 of FIG. 5, FIG. 7 is an exploded top plan view of the medial frame of said fixture, with the ballast and wire tray shown drawn out of the frame and in position for reinsertion and with the end cover members shown apart from the frame, FIG. 8 is a fragmentary, top plan view of one end of a second light casing 20 embodying the invention, FIG. 9 is an end elevational view thereof, taken at line 9—9 of FIG. 8, and FIG. 10 is an end elevational view of a device embodying the invention, taken at line 10—10 of FIG. 1.

As shown in the drawings the lighting fixture 12 (FIG. 5) of the invention, comprises an elongated frame 13 adopted to be secured to the free end 14 (FIG. 2) of a support structure 15. The latter (15) may be in the form of a davit whose lower end 16 is secured through base 17 (FIG. 1) to a roadway or other surface 18. The support structure 15 may be a building or other structure whose free end portion 14 extends essentially horizontally parallel to and above surface 18 to be illuminated by the fixture 12 (FIG. 5) of the invention. Light casings 19, 20 (FIGS. 2, 5) are secured to opposite sides of the frame 13 in an arrangement such that said casings may be rotated on their longitudinal axes to dispose them in relative transverse angular position to the axis 23 (FIG. 6) of a pair of transverse arms 21, 22 (FIGS. 5 and 6) of fixture frame 13 which in turn is secured to support 15. The relative angular position of light casings 19, 20, may be adjusted by means such as below described and shown in the drawings. Casings 19, 20 may have lights, light units or bulbs 24 therein and light permeable globes 25 (FIG. 5) enclosing said lights and held between first and second ends 26, 27 of the casings. As casings 19, 20 may be of essentially the same construction a description of one will suffice for both and corresponding reference characters are applied to both.

A first pair of arms 28, 29 extends laterally from one end of the frame 13 in transversely aligned relation and means are provided for rotatably journalling the first ends 26 of casings 19, 20 therein; angular adjustment of the casings is provided in the connection of the second ends 27 of the casings in a second pair of arms 21, 22 extending laterally from the casing 13 spaced from the first pair of arms 28, 29 thereof above mentioned. For that purpose the first ends 26 of the casings 19, 20 may be provided (FIGS. 2 and 5) with studs 30 (which may be of circular cross section) to be freely received in corresponding apertures 31 (FIG. 5) in arms 28 and 29; the second ends 27 of casings 19, 20 may be provided with studs 32 (FIG. 9) which may be hollow for the passage therethrough of the wires 33 (FIG. 5) for connection with light bulbs 24. Wires 33 (leading from a power source) may be secured to a ballast tray 34 or the like (FIG. 7) which may be slidably positioned in the frame 13. To attain the transverse, angular adjustment of the casing 20 above mentioned, a collar 40 (FIG. 9) is rotatably journalled on stud 32 projecting from the second end 27 of the casing 20; said end 27 has degree markings 39 thereon in an arc drawn radially of the center of the stud 32. Thus by rotating the collar 40, which may conveniently have a reference mark 41 thereon, on the stud 32, said collar may be aligned with the particular degree marking 39 which will provide the desired transverse angular displacement of the casing 20 relative to the transverse axis 23 (FIG. 6) of arms 21, 22. The collar 40 is keyed to the stud 32 after being rotated to said desired position (FIG. 9) by means of a set screw 42 or the like. Each of the second pair of arms 21, 22 may have a cover 43 (FIGS. 7 and 5) pivoted thereto as at 44, said cover, when rotated to closed position (FIG. 10) covering the collars 40 and studs 32 and wires 33. One of said covers (FIG. 5) may have a further cover member 45 secured thereto as at 46 (FIGS. 7 and 10) and may have a bracket 47 through which a bolt 48 passes, said bolt also passing through an aperture in the cover 43 and thence engaging a threaded aperture 48' (FIG. 5) in the arm 21. The collars 40 may be of non-circular outline as shown (FIG. 9). The arms 21, 22 may be provided with corresponding recesses 49 (FIG. 6) to receive said collars and to key them and thereby the light casings 19 and 20 to the frame 13. The latter is secured at one end 50 (FIG. 3) to support structure 15 as by the bracket 51, positioned, with end 50 of frame 13, around the support structure 15 (FIGS. 2, 3 and 5) and through which bolts 52 pass, said bolts being threaded into said end 50 of the frame 13.

To attain longitudinal, vertical adjustment of the fixture 12 (FIG. 5) of the invention relative to the longitudinal axis 52 (FIG. 3) of end portion 14 of support structure 15, a ring 53 is provided (FIGS. 1–4) formed to conform to the internal contour of the frame 13 so as to be slidable therein and provided with an aperture 54 therethrough. The width 55 of aperture 54 is only slightly greater than the transverse dimension of the end portion 14 of support 15; said aperture 54 is vertically extended (FIG. 4) substantially in excess of the vertical dimension of said end 14 of the support 15 so that the frame 13 and ring 53 therein may be vertically moved in a straight line on the member 14. The ring 53 is provided with threads 56, 57 through the top and bottom thereof and opening into the aperture 54 therethrough so that bolts 58 may be passed through apertures in the frame 13 and threaded through the apertures 56, 57 and into the aperture 54 in the ring 53 and against the member 14 at diametrically opposite points. Thus, by adjusting the bolts and fixing them (by nuts 59 or the like) in adjusted position the longitudinal angular disposition of the frame 13 and therefore the light fixture of this invention relative to the longitudinal axis 52 of the member 14 to which same is secured may be adjusted as desired. Thus the invention provides adjustment of the position of casings 19, 20 to precisely best suit them for the particular installation, and adjustment may be made in the field readily and accurately for each installation.

Having thus described my invention, what I claim as new and desire to secure by Letters Patent is:

1. A lighting fixture comprising an elongated frame, means for securing one end of said frame to a support in extended relation thereto, a first pair of arms extending laterally from said frame adjacent said support, a second pair of arms extending laterally outwardly of the sides of said frame and remote from said support, a pair of translucent casings, means at one end of each of said casings engaging said first pair of arms to freely journal said casings thereto and enable the casings to be rotated on their longinal axes while so journalled in said first pair of arms, and means on the other ends of said casings comprising studs apertured to receive power leads for said casings, collars of non-circular outline rotatably engaging said studs, means engaging the studs and collars for fixing the relative rotational position of the collars on the studs, and openings provided in the second pair of arms complementary to the collar outline for receiving and thus keying the collars in said arms.

2. In a lighting fixture as set forth in claim 1, angle markings on said second ends of the casings radially arranged relative to the center of said studs so that said collars may be first rotated on the studs to the desired angle marking for locating the casings at the desired angle, and may then be secured to the studs by said fixing means.

3. In a lighting fixture as set forth in claim 1, wherein said casing ends are apertured axially of the studs so that wires may be extended through the frame and thence through the studs and into the casings for connection with electric light units in the casings.

4. In a lighting fixture as set forth in claim 1, means engaging the second pair of arms and movable over the same and the second ends of the casings and the outer edge of the frame to enclose the same.

5. In a lighting fixture as set forth in claim 4, said means so engaging said second pair of arms being pivotally secured thereto.

6. In a lighting fixture as set forth in claim 5, means on said cover members engaging the frame to secure the cover members thereto.

7. In a lighting fixture as set forth in claim 5, said means engaging the second pair of arms comprising hollow cover members pivotally secured to said second pair of arms and movable over said second ends of the casing and arms to cover the same, and an extension on one of said cover members to be positioned over the frame member, and means to secure said cover members to the fixture.

8. In a lighting fixture as set forth in claim 1, said means for rotatably journalling the casings in the first pair of arms comprising studs extended from the first ends of the casings and complementary apertures provided in the first pair of arms through which the studs may be passed to rotatably journal the studs in said first pair of arms.

9. In a lighting fixture as set forth in claim 1, said frame being formed cross sectionally hollow and of larger dimensions than the support so that the support may be partially inserted into the frame, and means engaging the frame and support to secure the frame to the support, with the latter so partially inserted in the frame.

10. In a lighting fixture as set forth in claim 9, a ring slidably positioned within the frame and having an internal opening to receive the ends of the frame support for vertical movement in said opening, and complementary means engaging said ring and frame, to position the frame angularly, axially relative to the plane of the fixture support.

11. In a lighting fixture as set forth in claim 10, said ring conforming to the internal contour of the frame for slidable movement of the ring therein.

12. In a fixture device as set forth in claim 11, said ring being so provided with an internal aperture transversely wider than the width of the fixture support and perpendicularly of substantially greater dimensions than the fixture support so that the ring and frame may be vertically moved relative to said fixture support in aligned relation thereto.

13. In a fixture device as set forth in claim 12, means engaging the ring and support for securing the frame in adjusted position in the support for securing the frame and said ring together.

References Cited in the file of this patent

UNITED STATES PATENTS

| | | |
|---|---|---|
| 1,458,000 | Powell et al. | June 5, 1923 |
| 2,039,541 | Lekometros | May 5, 1936 |
| 2,574,886 | Phillips | Nov. 13, 1951 |
| 2,807,709 | Guth | Sept. 24, 1957 |
| 2,835,788 | Phillips | May 20, 1958 |
| 2,908,809 | Beach et al. | Oct. 13, 1959 |

FOREIGN PATENTS

| | | |
|---|---|---|
| 918,462 | Germany | Sept. 27, 1954 |